(12) United States Patent
Hernandez et al.

(10) Patent No.: US 8,142,148 B2
(45) Date of Patent: Mar. 27, 2012

(54) DIFFUSER-NOZZLE ASSEMBLY FOR A TURBOMACHINE

(75) Inventors: Didier Hippolyte Hernandez, Quiers (FR); Romain Nicolas Lunel, Montereau sur le Jard (FR)

(73) Assignee: SNECMA, Paris (FR)

( * ) Notice: Subject to any disclaimer, the term of this patent is extended or adjusted under 35 U.S.C. 154(b) by 585 days.

(21) Appl. No.: 12/361,878

(22) Filed: Jan. 29, 2009

(65) Prior Publication Data
US 2009/0214333 A1 Aug. 27, 2009

(30) Foreign Application Priority Data
Feb. 27, 2008 (FR) ...................................... 08 01064

(51) Int. Cl.
*F01D 1/02* (2006.01)
(52) U.S. Cl. ................... 415/211.1; 415/208.3; 415/203
(58) Field of Classification Search ............... 415/208.3, 415/211.2, 203; 60/751
See application file for complete search history.

(56) References Cited

U.S. PATENT DOCUMENTS

| | | | |
|---|---|---|---|
| 3,759,038 A | 9/1973 | Scalzo et al. | |
| 3,999,883 A | 12/1976 | Nordenson | |
| 4,100,732 A * | 7/1978 | Bryans et al. | 60/804 |
| 4,344,737 A * | 8/1982 | Liu | 415/199.1 |
| 4,462,204 A * | 7/1984 | Hull | 60/806 |
| 4,761,947 A * | 8/1988 | Hennecke et al. | 60/806 |
| 4,854,126 A * | 8/1989 | Chevis et al. | 60/726 |
| 4,921,401 A | 5/1990 | Hall et al. | |
| 4,981,018 A * | 1/1991 | Jones et al. | 60/726 |
| 5,555,721 A * | 9/1996 | Bourneuf et al. | 60/806 |
| 5,619,850 A * | 4/1997 | Palmer et al. | 60/772 |
| 6,067,791 A * | 5/2000 | Patel | 60/784 |
| 6,279,322 B1 * | 8/2001 | Moussa | 60/751 |
| 6,506,015 B2 * | 1/2003 | Nagata et al. | 415/173.1 |
| 6,513,335 B2 * | 2/2003 | Fukutani | 60/785 |
| 6,585,482 B1 * | 7/2003 | Liotta et al. | 415/116 |
| 6,589,015 B1 * | 7/2003 | Roberts et al. | 415/208.3 |
| 7,363,762 B2 * | 4/2008 | Montgomery et al. | 60/685 |
| 7,442,006 B2 * | 10/2008 | Nguyen et al. | 415/208.4 |
| 7,500,364 B2 * | 3/2009 | Schumacher et al. | 60/751 |
| 7,628,583 B2 * | 12/2009 | Roberts et al. | 415/208.3 |
| 7,823,387 B2 * | 11/2010 | Commaret et al. | 60/752 |
| 7,827,798 B2 * | 11/2010 | Commaret et al. | 60/751 |
| 7,841,187 B2 * | 11/2010 | Behaghel et al. | 60/785 |
| 7,908,869 B2 * | 3/2011 | Ivakitch et al. | 60/798 |
| 7,937,944 B2 * | 5/2011 | Brunet et al. | 60/751 |
| 7,937,951 B2 * | 5/2011 | Brunet et al. | 60/806 |
| 2002/0146320 A1 * | 10/2002 | Moussa et al. | 415/208.3 |
| 2003/0235497 A1 * | 12/2003 | Meng | 415/208.3 |
| 2005/0118019 A1 * | 6/2005 | Roberts et al. | 415/206 |

(Continued)

FOREIGN PATENT DOCUMENTS
DE 24 35 474 2/1976
(Continued)

*Primary Examiner* — Ross Gushi
(74) *Attorney, Agent, or Firm* — Oblon, Spivak, McClelland, Maier & Neustadt, L.L.P.

(57) ABSTRACT

A diffuser-nozzle assembly mounted at the outlet from a centrifugal compressor is disclosed. The assembly includes a plurality of vanes carried by a radially inner wall forming a surface of revolution and surrounded by an outer casing, elastically deformable devices interposed between the radially outer ends of the vanes of the nozzle and the outer casing. The elastically deformable devices prevent air from passing between the outer casing and the radially outer ends of the vanes.

14 Claims, 1 Drawing Sheet

U.S. PATENT DOCUMENTS

| | | |
|---|---|---|
| 2007/0036646 A1* | 2/2007 | Nguyen et al. ............. 415/208.3 |
| 2007/0113557 A1* | 5/2007 | Schumacher et al. .......... 60/751 |
| 2008/0019828 A1* | 1/2008 | Commaret et al. ........ 415/208.1 |
| 2008/0019829 A1* | 1/2008 | Argaud et al. ............. 415/211.2 |
| 2008/0069690 A1* | 3/2008 | Ivakitch et al. ............ 415/213.1 |
| 2008/0141674 A1* | 6/2008 | Commaret et al. ............. 60/755 |
| 2008/0141678 A1* | 6/2008 | Brunet et al. ................... 60/806 |
| 2008/0141679 A1* | 6/2008 | Behaghel et al. ............... 60/806 |
| 2008/0141680 A1* | 6/2008 | Brunet et al. ................... 60/806 |
| 2008/0245053 A1* | 10/2008 | Commaret et al. .......... 60/226.1 |
| 2009/0047127 A1* | 2/2009 | Commaret et al. ........ 415/211.2 |
| 2009/0214333 A1* | 8/2009 | Hernandez et al. .......... 415/203 |
| 2010/0031663 A1* | 2/2010 | Commaret et al. ............. 60/751 |
| 2010/0043449 A1* | 2/2010 | Commaret et al. ............. 60/796 |
| 2011/0056207 A1* | 3/2011 | Commaret et al. ............. 60/751 |
| 2011/0097204 A1* | 4/2011 | Hernandez et al. .......... 415/207 |

FOREIGN PATENT DOCUMENTS

| | | |
|---|---|---|
| DE | 10 2004 039 473 A1 | 3/2006 |
| EP | 1 149 986 A2 | 10/2001 |
| FR | 2 462 557 | 2/1981 |
| FR | 2 581 135 | 10/1986 |
| JP | 2000-345997 | 12/2000 |

* cited by examiner

DIFFUSER-NOZZLE ASSEMBLY FOR A TURBOMACHINE

The invention relates to a diffuser-nozzle assembly for feeding air to an annular combustion chamber in a turbomachine such as an airplane turbojet or turboprop.

TECHNOLOGICAL BACKGROUND OF THE INVENTION

A turbomachine comprises a high pressure compressor having its downstream end opening out to the inlet of a combustion chamber. In certain configurations, where it is desirable to reduce the axial size of the turbomachine, the last compression stage is a centrifugal stage having its outlet surrounded by a radial annular diffuser that is connected to an annular nozzle opening out to the inlet of the combustion chamber. The nozzle comprises a radially inner wall forming a surface of revolution that carries a plurality of vanes surrounded on the outside by a casing that extends downstream around the combustion chamber.

When cold, clearance is provided between the radially outer ends of the vanes of the nozzle and the outer casing. In operation, the nozzle expands radially to a greater extent than the casing, and the radially outer ends of the vanes come into contact with the outer casing. The clearance at the tops of the vanes of the nozzle is defined in such a manner as to guarantee that the radially outer ends of the vanes of the nozzle press against the casing with a force that is small enough to avoid excessively stressing the casing in operation since it is already subjected to large pressure variations due to fuel combustion in the chamber downstream from the high pressure compressor.

Nevertheless, the cold clearance at the tops of the vanes can be defined for only one particular stage of flight, for example a cruising stage since that is the stage that lasts the longest. During other stages of flight, the radially outer ends of the vanes of the nozzle either do not make contact with the casing, thereby allowing air to flow between the tops of the vanes and the casing and thus disturbing the flow of air towards the combustion chamber, or else the tops of the vanes exert excess pressure against the casing. Furthermore, when the ends of the vanes are not pressed against the casing, the nozzle is subjected to vibration.

SUMMARY OF THE INVENTION

A particular object of the invention is to provide a solution to these problems that is simple, effective, and inexpensive.

To this end, the invention provides a diffuser-nozzle assembly mounted at the outlet from a centrifugal compressor in a turbomachine, the diffuser comprising two annular plates, an upstream plate and a downstream plate, that are joined together by vanes, the upstream annular plate having its radially outer end bearing against an outer casing, the nozzle comprising a plurality of vanes carried by a radially inner wall forming a surface of revolution and surrounded by the outer casing, wherein elastically deformable means are interposed between the radially outer ends of the vanes of the nozzle and the outer casing, said means preventing air from passing between the outer casing and the radially outer ends of the vanes.

These elastically deformable means enable permanent contact to be guaranteed between the radially outer ends of the vanes and the outer casing, thus making it possible to absorb and damp a fraction of the vibration of the nozzle. These means also guarantee sealing between the radially outer ends of the vanes of the nozzle and the casing during all stages of flight. The flow of air going to the combustion chamber is thus undisturbed by any parasitic flow between the casing and the radially outer ends of the vanes of the nozzle, thereby improving the performance of the turbomachine.

Having the radially outer end of the upstream annular plate bearing against the outer casing enables the diffuser to be centered in the outer casing.

In an embodiment of the invention, the elastically deformable means comprise an annular metal sheet having a portion that is spaced apart from the outer casing bearing against the radially outer ends of the vanes, and having at least one end bearing against the casing.

According to another characteristic of the invention, one end of the annular metal sheet is fastened to the outer casing and its other end bears slidingly against the outer casing.

Thus, in operation, the differential expansion between the casing and the nozzle leads the radially outer ends of the vanes to bear against the portion of the metal sheet that is spaced apart from the outer casing, and as a result, because one of the ends of the annular metal sheet is fastened to the casing, this causes the other end of the metal sheet to slide relative to the outer casing.

Advantageously, the end of the metal sheet that bears slidingly against the casing is guided in an annular groove formed in a radially outer end of the upstream annular plate of the diffuser. The annular groove may be formed between a radially outer cylindrical end rim of the upstream annular plate and the outer casing.

The metal sheet is preferably made of a material that presents a coefficient of thermal expansion similar to those of the casing and/or the nozzle, thereby guaranteeing similar mechanical behavior between the various parts that are in contact.

The metal sheet may have thickness lying in the range 1 millimeter (mm) to 1.5 mm, and it may be fastened to the outer casing by welding, brazing, or riveting.

It may include a sealing coating such as an elastomer, for example, for improving sealing of the contact between the metal sheet and the vanes. It may also include a coating that withstands wear due to the radially outer ends of the vanes rubbing thereagainst.

The metal sheet may be mounted with resilient prestress when cold between the outer casing and the radially outer ends of the vanes of the nozzle, thus ensuring in operation that the metal sheet is continuously urged elastically against the outer casing and against the radially outer ends of the vanes of the nozzle during all stages of flight.

The invention also provides an elastically deformable annular metal sheet for use in a diffuser-nozzle assembly of the above-described type, wherein the sheet is generally frustoconical in shape with flared ends.

The metal sheet may be made as a single piece occupying 360°.

The invention also provides a turbomachine such as a turbojet or a turboprop, wherein the turbomachine includes a diffuser-nozzle assembly as described above.

BRIEF DESCRIPTION OF THE DRAWING

The invention can be better understood and other details, advantages, and characteristics of the invention appear on reading the following description made by way of non-limiting example with reference to the accompanying drawing, in which.

DETAILED DESCRIPTION

Figure 1:
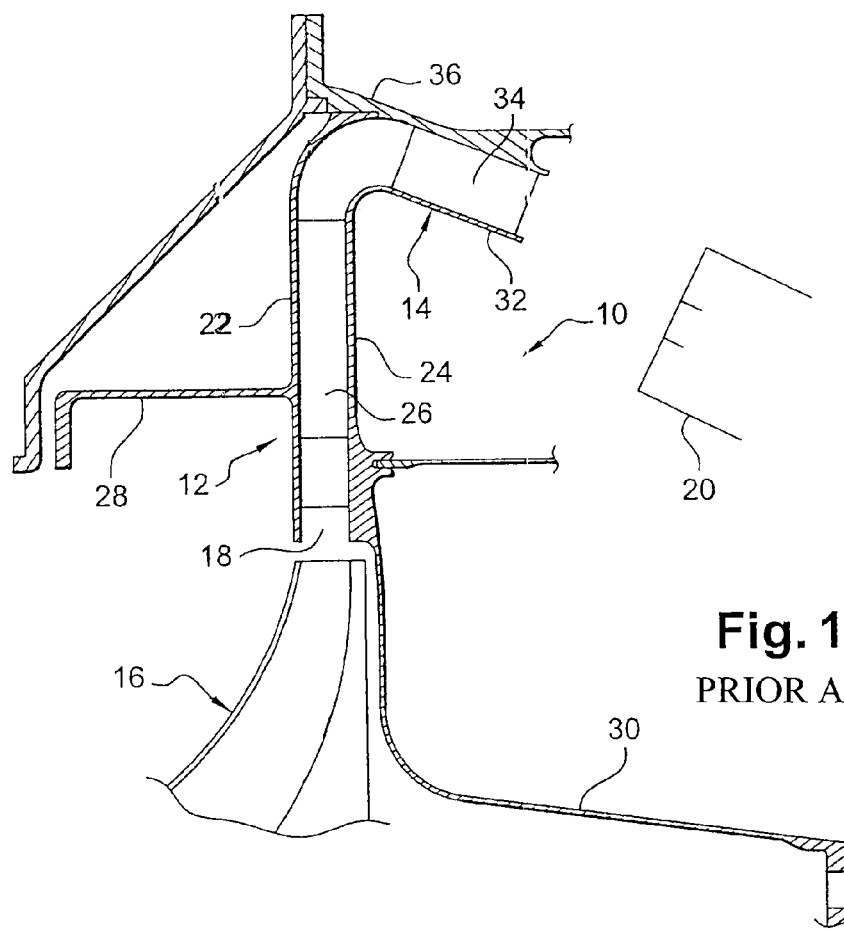
FIG. 1 is a diagrammatic half-view in axial section of a diffuser-nozzle assembly of the prior art.
Figure 2:
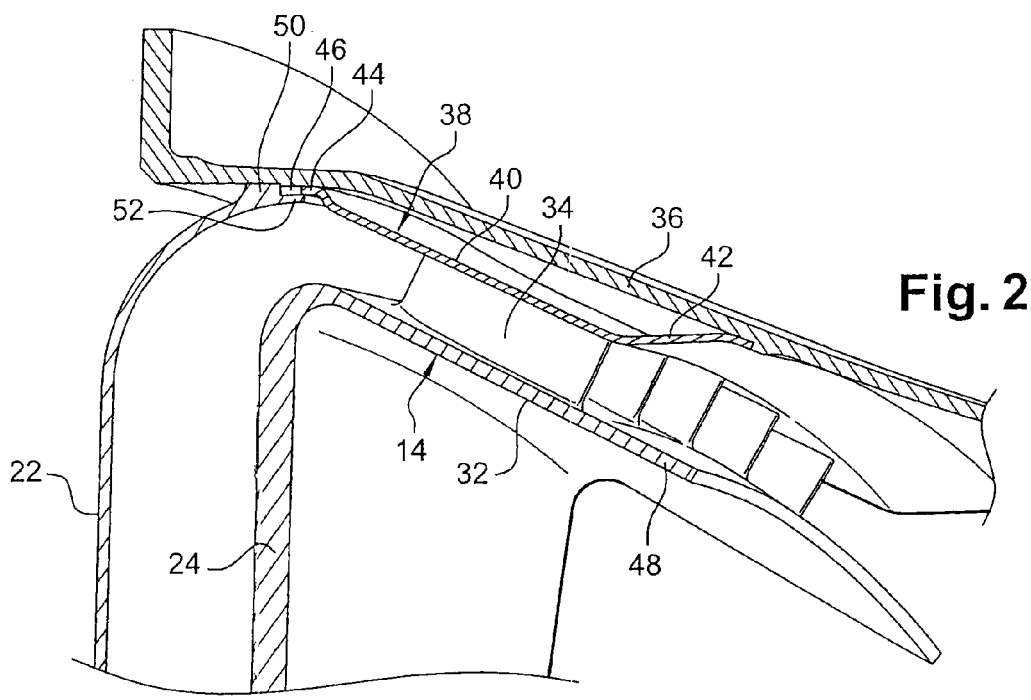
FIG. 2 is a diagrammatic perspective view of a diffuser-nozzle assembly of the invention.

The diffuser-nozzle assembly 10 shown in FIG. 1 forms part of means for feeding an annular combustion chamber of a turbomachine with air, and it comprises a radial annular diffuser 12 having its outlet connected to an annular nozzle 14, the assembly being for mounting at the outlet from the centrifugal last stage 16 of a compressor of the turbomachine. The inlet 18 of the diffuser 12 is in radial alignment with the outlet from the centrifugal stage 16, and the outlet from the nozzle 14 feeds air to the annular combustion chamber 20, in a manner that is well known to the person skilled in the art.

The diffuser 12 comprises an upstream annular plate 22 and a downstream annular plate 24, which plates are parallel and extend annularly around the axis of rotation of the compressor, and they are interconnected by vanes 26. The upstream and downstream annular plates 22 and 24 are held in position by respective upstream and downstream annular walls 28 and 30 that are fastened to stationary portions of the turbomachine.

The nozzle 14 comprises a frustoconical portion 32 of section that tapers downstream, carrying a plurality of substantially radial vanes 34 that are surrounded on the outside by an outer casing 36.

When the diffuser-nozzle assembly is mounted, clearance is provided between the radially outer ends of the vanes 34 and the casing 36 in order to avoid the outer casing 36 being prestressed when cold.

In operation, the expansion of the nozzle 14 is greater than the expansion of the casing 36, thus causing the radially outer ends of the vanes 34 of the nozzle 14 to come into contact with the outer casing 36, thereby preventing air from flowing between the tops of the vanes 34 and the casing 36, and also limiting vibration of the nozzle 14.

Nevertheless, for the reasons given above, clearance can be optimized for only one specific stage of flight and not for the entire duration of a flight, thereby limiting the performance of the turbomachine.

The invention enables the clearance between the radially outer ends of the vanes 34 and the outer casing 36 to be eliminated by using elastically-deformable means that are interposed between the ends of the vanes 34 of the nozzle and the outer casing 36, said means preventing any air from passing between the casing 36 and the tops of the vanes 34, and also limiting vibration of the nozzle 14.

These means comprise an annular metal sheet 38 forming a surface of revolution 40 substantially parallel to the inner wall 32 of the nozzle 14. This wall 40 of frustoconical shape and of section that tapers going downstream is spaced apart radially from the outer casing 36 and its middle portion is in contact with the radially outer ends of the vanes 34 of the nozzle 14. The downstream end 42 of the frustoconical wall 40 is substantially cylindrical and it is fastened to the outer casing 36, while the upstream end of the wall has a substantially cylindrical rim 44 that is slidably engaged in an annular groove 46.

The downstream end 48 of the inner wall 32 of the nozzle 14 extends downstream from the vanes 34 of the nozzle 14 and is placed facing the downstream cylindrical wall 42 of the annular metal sheet 38.

The radially outer end of the upstream annular plate 22 is curved downstream and bears radially against the outer casing, thereby enabling the diffuser to be centered in the outer casing. This end includes an annular portion 50 of extra thickness against which the outer casing 36 comes into radial contact. The annular groove 46 is formed between the outer casing 36 and the cylindrical rim 52 of the downstream end of the curved portion, the portion 50 of extra thickness forming the bottom of the groove 46.

When the turbomachine is in operation, the expansion of the nozzle 14 causes the radially outer ends of the vanes 34 to press against the metal sheet 38, which deforms to approach the outer casing 36, and since the metal sheet is fastened at its downstream end, this leads to its upstream end sliding in the annular groove 46.

Thus, the radially outer ends of the vanes 34 are always in contact with the annular sheet 38, thus making it possible throughout the operation of the turbomachine, firstly to absorb and limit vibration of the nozzle 14, and secondly to avoid air coming from the diffuser 12 flowing between the casing 36 and the radially outer ends of the vanes 34 of the nozzle 14. The deformation of the metal sheet 38 serves to accommodate all of the differences in expansion between the outer casing 36 and the nozzle 14, thereby avoiding the vanes 34 of the nozzle 14 exerting stress on the outer casing 36.

The annular groove 46 needs to present sufficient axial depth to enable the upstream end of the annular metal sheet 38 to move axially, both as a result of the nozzle 14 expanding and as a result of the annular metal sheet 38 itself expanding.

Advantageously, the metal sheet 38 is made of a material that presents a coefficient of thermal expansion that is similar to the coefficients of expansion of the outer casing 36 and/or of the nozzle 14, so as to guarantee, in operation, that the metal sheet behaves in a manner similar to that of the nozzle 14 and the casing 36.

Advantageously, the metal sheet 38 can be mounted with resilient prestress when cold between the outer casing 36 and the radially outer ends of the vanes 34 of the nozzle 14, thereby ensuring, in operation, that the metal sheet 38 is continuously urged elastically against the outer casing 36 and against the radially outer ends of the vanes 34 of the nozzle 14.

The metal sheet 38 may be made as a single piece occupying 360° and it may have a sealing coating on its inside surface, e.g. of elastomer in order to improve sealing where the metal sheet 38 bears against the ends of the vanes 34. It may also include a coating for withstanding wear at the radially outer ends of the vanes 34 of the nozzle 14.

The thickness of the metal sheet 38 lies in the range about 1 mm to 1.5 mm.

The downstream end of the cylindrical wall 42 of the metal sheet 38 may be fastened to the outer casing 36 by welding, brazing, or riveting.

In another embodiment of the invention that is not shown in the drawing, the metal sheet 38 may be fastened to the outer casing 36 at its upstream end, while being free to slide in an annular groove at its downstream end.

What is claimed is:
1. An assembly comprising:
a diffuser and a nozzle mounted at the outlet from a centrifugal compressor in a turbomachine,
the diffuser comprising two annular plates, an upstream plate and a downstream plate, that are joined together by vanes, the upstream annular plate having its radially outer end bearing against an outer casing,
the nozzle comprising a plurality of vanes carried by a radially inner wall forming a surface of revolution and surrounded by the outer casing,
wherein elastically deformable means are interposed between the radially outer ends of the vanes of the nozzle and the outer casing, said means preventing air from passing between the outer casing and the radially outer ends of the vanes.

2. An assembly according to claim 1, wherein the elastically deformable means comprise an annular metal sheet having a portion that is spaced apart from the outer casing bearing against the radially outer ends of the vanes, and having at least one end bearing against the casing.

3. An assembly according to claim 2, wherein one end of the annular metal sheet is fastened to the outer casing and its other end bears slidingly against the outer casing.

4. An assembly according to claim 3, wherein the other end of the metal sheet is guided in an annular groove in a radially outer end of the upstream annular plate of the diffuser.

5. An assembly according to claim 4, wherein the annular groove is formed between a cylindrical rim of the radially outer end of the upstream annular plate and the outer casing.

6. An assembly according to claim 2, wherein the metal sheet has a thickness of about 1 mm to 1.5 mm.

7. An assembly according to claim 2, wherein the metal sheet is made of a material presenting a coefficient of thermal expansion similar to the coefficients of expansion of the casing and of the nozzle.

8. An assembly according to claim 2, wherein the metal sheet is fastened to the outer casing by welding, brazing, or riveting.

9. An assembly according to claim 2, wherein the metal sheet includes a sealing coating.

10. An assembly according to claim 2, wherein the metal sheet includes a coating that withstands wear.

11. An assembly according to claim 2, wherein the metal sheet is mounted with elastic prestress between the outer casing and the radially outer ends of the vanes of the nozzle.

12. An elastically deformable annular metal sheet for use in a diffuser-nozzle assembly according to claim 2, wherein the sheet is generally frustoconical in shape with flared ends.

13. A sheet according to claim 12, made as a single piece occupying 360°.

14. A turbomachine including a diffuser-nozzle assembly according to claim 1.

* * * * *